US008699646B2

(12) United States Patent
Olsen et al.

(10) Patent No.: US 8,699,646 B2
(45) Date of Patent: Apr. 15, 2014

(54) MEDIA CLOCK NEGOTIATION

(75) Inventors: David Olsen, Kaysville, UT (US); Levi Pearson, Lehi, UT (US)

(73) Assignee: Harman International Industries, Inc., Stamford, CT (US)

( * ) Notice: Subject to any disclaimer, the term of this patent is extended or adjusted under 35 U.S.C. 154(b) by 239 days.

(21) Appl. No.: 13/156,866

(22) Filed: Jun. 9, 2011

(65) Prior Publication Data

US 2012/0263263 A1    Oct. 18, 2012

Related U.S. Application Data

(60) Provisional application No. 61/476,617, filed on Apr. 18, 2011.

(51) Int. Cl.
*H04L 7/00* (2006.01)
(52) U.S. Cl.
USPC .......................................... 375/354; 370/503
(58) Field of Classification Search
USPC ........... 375/354, 356, 358; 370/503, 507, 510
See application file for complete search history.

(56) References Cited

U.S. PATENT DOCUMENTS

| | | | | |
|---|---|---|---|---|
| 5,761,430 | A | 6/1998 | Gross et al. | 395/200.55 |
| 6,101,195 | A * | 8/2000 | Lyons et al. | 370/498 |
| 8,428,045 | B2 * | 4/2013 | Gelter et al. | 370/350 |
| 2004/0073951 | A1 * | 4/2004 | Bae et al. | 725/135 |
| 2006/0140252 | A1 * | 6/2006 | Miller | 375/138 |
| 2007/0223464 | A1 * | 9/2007 | Weir et al. | 370/356 |
| 2009/0234965 | A1 | 9/2009 | Viveganandhan et al. | 709/231 |
| 2011/0228768 | A1 * | 9/2011 | Gelter et al. | 370/389 |
| 2011/0231565 | A1 * | 9/2011 | Gelter et al. | 709/231 |
| 2011/0231566 | A1 * | 9/2011 | Gelter et al. | 709/231 |

OTHER PUBLICATIONS

IEEE Standard for Layer 2 Transport Protocol for Time-Sensitive Applications in Bridged Local Area Networks, IEEE 1722-2011, May 6, 2011, pp. 1-57, IEEE Standards Association, New York.
IEEE P1722™/D2.5 Draft Standard for Layer 2 Transport Protocol for Time-Sensitive Applications in Bridged Local Area Networks, Sep. 2010, pp. 1-65, Institute of Electrical and Electronics Engineers, Inc., New York.
Extended European Search Report, dated Sep. 11, 2012, pp. 1-4, European Patent Application No. 12163259.0, European Patent Office, The Netherlands.
Olsen, D. "Media Clock Distribution in a 1722 Network", dated Oct. 22, 2008, pp. 1-22, Harman International Industries, Inc., IEEE 1722 Meeting, Cupertino California.

* cited by examiner

*Primary Examiner* — Jean B Corrielus
(74) *Attorney, Agent, or Firm* — Alleman Hall McCoy Russell & Tuttle LLP

(57) ABSTRACT

Media Clock Negotiation (MCN) Advertise packets may advertise one or more media clock streams. Each media clock stream may include values of a real-time clock sampled according to a first media clock. A second media clock may be recoverable from the media clock stream such that the second media clock is synchronized with the first media clock. One or more transmitters that receive the packets may determine whether the advertised media clock stream meets a set of media clock conditions. If the advertised media clock stream meets the set of media clock conditions, then the transmitter may add the advertised media clock stream to a set of qualified streams. Each transmitter may select a reference media clock stream from the set of qualified streams. By selecting the same reference media clock stream, media clocks at two or more transmitters may be synchronized.

21 Claims, 5 Drawing Sheets

MEDIA CLOCK NEGOTIATION

PRIORITY CLAIM

This application claims priority under 35 U.S.C. §119(e) to U.S. Provisional Application No. 61/476,617, entitled "MEDIA CLOCK NEGOTIATION," filed Apr. 18, 2011, which is incorporated by reference.

BACKGROUND OF THE INVENTION

1. Technical Field

This application relates to media streams and, in particular, to media clocks for sampling media streams.

2. Related Art

Audio/video media streams may be transmitted from a transmitter to a receiver. The transmitter may encapsulate samples of a media stream in packets, and transmit the packets to the receiver. The packets may be isochronous packets.

SUMMARY

In accordance with a Media Clock Negotiation (MCN) Protocol, MCN Advertise packets may be received over a network advertising one or more media clock streams, such as Audio/Video Bridging Transport Protocol (AVBTP) streams. Each media clock stream may include timestamps that are based on values of a real-time clock located at a source of the media clock stream, where the real-time clock is sampled according to a first media clock also located at the source of the media clock stream. A second media clock may be recoverable from the media clock stream such that the second media clock is synchronized with the first media clock. One or more transmitters may receive the MCN Advertise packets during a clock identification period. Each transmitter may determine whether each advertised media clock stream meets a set of media clock conditions, such as a target frequency and a target clock domain identifier. If the advertised media clock stream meets the set of media clock conditions, then the transmitter may add the advertised media clock stream to a set of qualified streams. Each transmitter may select a reference media clock stream from the set of qualified streams. If two or more transmitters use the same set of media clock conditions, then the transmitters may select the same reference media clock stream or one of the transmitters may receive the reference media clock stream from another one of the transmitters. As a result, media clocks at two or more transmitters may be synchronized. Media streams, such as audio/video streams, which may be subsequently transmitted by the transmitters, may be aligned due to the media clocks at the transmitters being synchronized with each other.

One interesting aspect is that the media clock stream corresponding to a local media clock may be advertised in the MCN Advertise packets if the media clock stream has a higher priority than any stream included in the set of qualified streams after expiration of the clock identification period. Alternatively, if the media clock stream does not have a higher priority than any stream included in the set of qualified streams after expiration of the clock identification period, then the media clock stream corresponding to the local media clock may not be advertised.

A further interesting aspect is that if one of the qualified stream times out, then a qualified stream in the set of qualified streams that is not timed out may be selected as the reference media clock stream. Furthermore, if one or more of the qualified streams times out and the media clock stream corresponding to the local media clock is not in the set of qualified streams, then the media clock steam corresponding to the local media clock may be added to the set of qualified streams if appropriate.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

In accordance with a Media Clock Negotiation (MCN) Protocol, MCN Advertise packets may be transmitted over a network to advertise one or more media clock streams, such as Audio/Video Bridging Transport Protocol (AVBTP) streams, from which a media clock may be generated. One or more transmitters may receive the MCN Advertise packets during a clock identification period. Each transmitter may determine whether each advertised media clock stream meets a set of media clock conditions. For example, the set of media clock conditions may include a target frequency and a target clock domain identifier. If the advertised media clock stream meets the set of media clock conditions, then the transmitter may add the advertised media clock stream to a set of qualified streams. At the end of the clock identification period, each transmitter may select a reference media clock stream from the set of qualified streams. For example, two or more transmitters that use the same set of media clock conditions may select the same reference media clock stream. Each of the transmitters may generate a media clock from the selected reference media clock stream. As a result, the media clocks at two or more transmitters may be synchronized.

In addition, the transmitter may transmit a media stream to a receiver over the network, where the media stream is sampled according to the generated media clock. Consequently, the media streams transmitted by the transmitters and received by the receiver may be synchronized with each other. The ability to synchronize media clocks across multiple transmitters may eliminate the need for sample rate conversion when the receiver receives the media streams from the transmitters. In addition, a system including the transmitters may support media clocks of various frequencies, clock speeds, clock domains, and quality or priority.

Each transmitter or other device that is configured to generate a media clock stream from a local media clock may determine whether the media clock stream has a higher priority than any stream in the set of qualified streams after a clock identification period elapses. If the media clock stream has a higher priority than any stream in the set, then the transmitter may advertise the media clock stream in Media Clock Negotiation Advertise packets. In contrast, if the media clock stream has a lower priority than any stream in the set of qualified streams, then the transmitter may not to advertise the media clock stream.

Figure 1:
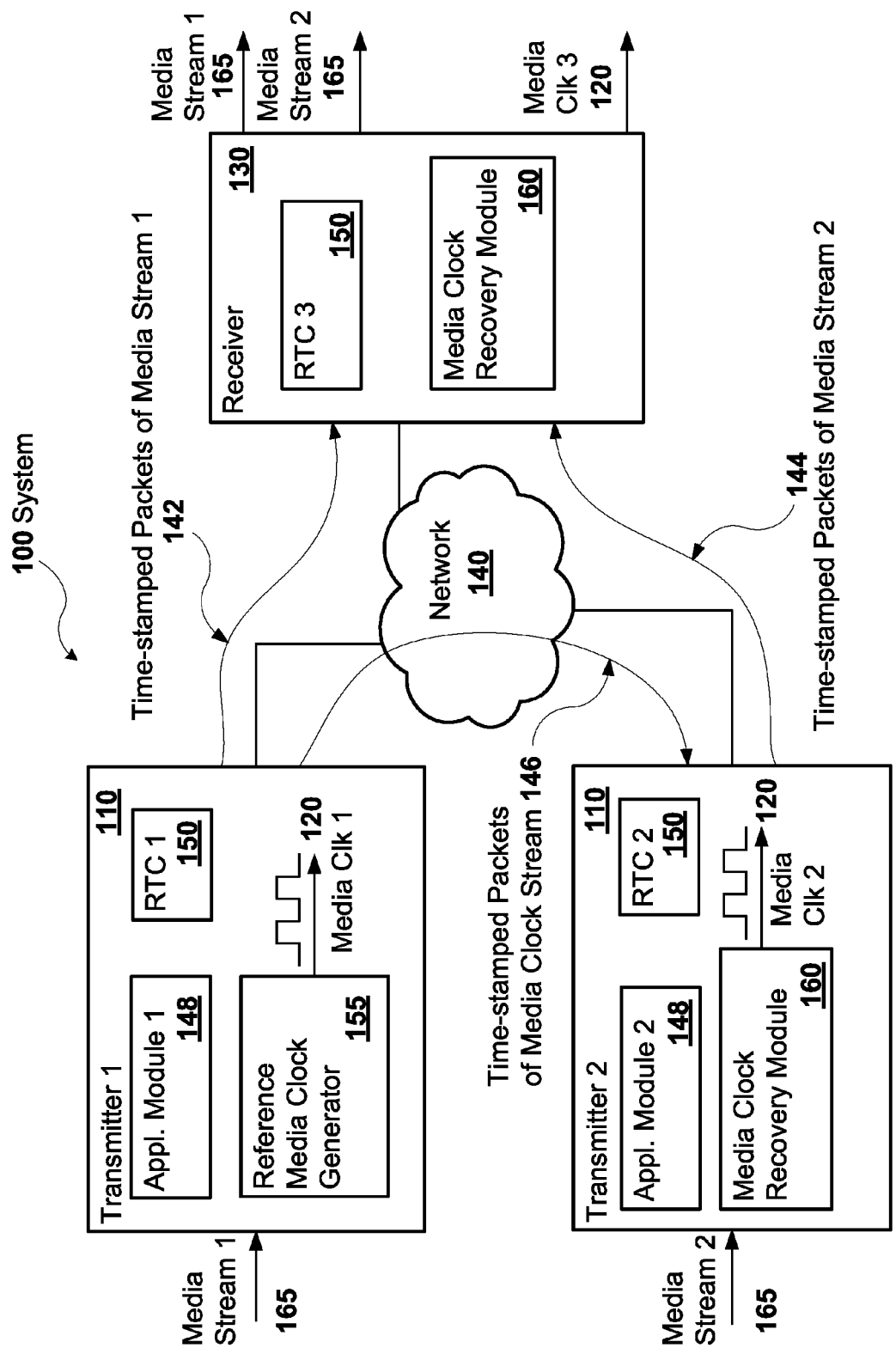
FIG. 1 illustrates an example of a system in which transmitters generate media clocks that are synchronized based on a Media Clock Negotiation Protocol.

FIG. 1 illustrates an example of a system 100 in which transmitters 110 (individually designated transmitter 1 and transmitter 2, respectively) generate media clocks 120 (individually designated media clock 1 and media clock 2, respectively) that are synchronized based on the MCN Protocol. Two clocks may be considered synchronized when the frequencies of the two clocks are the same frequency and the two clocks are in phase with each other. Frequencies are considered the same and clocks are considered in phase if the corresponding values are within an acceptable margin of error of each other.

The system 100 may include the transmitters 110 and a receiver 130. The system 100 may include additional transmitters 110 and additional receivers. The transmitters 110 and the receiver 130 may communicate with each other over a network 140.

The network 140 may be any communications network. For example, the network 140 may include a packet-switched network, such as a local area network (LAN), a wireless local area network (WLAN), a personal area network (PAN), a wide area network (WAN), the Internet, or a combination thereof. The network 140 may support communications protocols that communicate packets, such as time-stamped packets 142, 144, and 146, MCN Advertise packets, packets used by a clock synchronization protocol, or any other type of packet.

Each of the transmitters 110 may include a component that transmits one or more media streams 165 encapsulated in the time-stamped packets 142 and 144 to one or more receivers, such as the receiver 130 in FIG. 1. In the example illustrated in FIG. 1, Transmitter 1 transmits one of the media streams 165 (designated Media Stream 1) to the receiver 130, and Transmitter 2 transmits one of the media streams 165 (designated media stream 2) to the receiver 130. Transmitter 1 includes an application module 148 (designated Application Module 1), a real-time clock 150 (designated RTC 1), and a reference media clock generator 155. Transmitter 2 includes the application module 148 (designated application module 2), the real-time clock 150 (designated RTC 2), and a media clock recovery module 160.

The receiver 130 may include a component that receives the time-stamped packets 142 and 144 from the transmitters 110. The receiver 130 may include the RTC 150 (designated RTC 3) and the media clock recovery module 160.

The reference media clock generator 155 in Transmitter 1 includes a component that generates the media clock 120 in Transmitter 1. Examples of the media clock generator 155 include a phase-locked loop, a frequency synthesizer, a DDS (direct digital synthesizer), a Direct Analog Synthesis, a digital PLL (phase-locked loop) synthesizer such as an integer-N synthesizer and a fractional-N synthesizer, or any other device that generated a fixed-frequency reference clock.

The media clock 120 may be any periodic signal indicative of a sampling rate of data in one or more of the media streams 165, a sampling rate of the RTC 150, or a combination thereof. For example, the media clock 120 may be a square wave, a pulse wave, a sinusoid, or any other suitable periodic wave form. The frequency of the media clock 120 may be the sampling rate frequency. The frequency of the media clock 120 may be a multiple or fraction of the sampling rate. In one example, the frequency of the media clock 120 may correspond to twice the sampling rate of the data in the media streams 165. In a second example, the frequency of the media clock 120 may be an eighth of the sampling rate. In a third example, where the media stream 120 includes NTSC (National Television System Committee) video, the sampling rate may be a pixel clock rate of 27 MHz and the frequency of the media clock 120 may be 15.734 kHz, which is sometimes referred to as the video line rate.

The media clock recovery module 160, such as the media clock recovery module 160 in Transmitter 2 and in the receiver 130, includes a component that generates the media clock 120 from one or more of the time-stamped packets 142, 144, and 146. Examples of the media clock recovery module 160 are described in U.S. application Ser. No. 12/874,836, "MEDIA CLOCK RECOVERY" filed Sep. 2, 2010. The media clock recovery module 160 generates the media clock 120 such that the media clock 120 is synchronized with the media clock 120 used to generate the time-stamped packets 142, 144, and 146.

The real-time clock (RTC) 150 in the transmitters 110 and the receiver 130 may include a counter that increases or decreases at a rate determined by a clock, such as a RTC clock in each of the transmitters 110 and the receiver 130. For example, the RTC 150, such as RTC 1, RTC 2, and RTC 3, may be implemented as an accumulation register, digital counter, real-time clock IC (integrated circuit) or any other suitable device. A digital counter may be any semiconductor device that counts the number of times a digital event has occurred. The digital event may be a rising or falling edge of the RTC clock, for example. RTC 1, RTC 2, and RTC 3 may be synchronized using any clock synchronization protocol.

The clock synchronization protocol may include a protocol for exchanging messages between nodes in order to synchronize the RTC at one node, such as Transmitter 1, with the RTC at a second node, such as the receiver 130. Examples of the clock synchronization protocol include IEEE (Institute of Electrical and Electronics Engineers) 1588:2002 Standard for a Precision Clock Synchronization Protocol for Networked Measurement and Control Systems, and IEEE 802.1AS Precision Time Protocol (PTP) in IEEE 802.1AS Standard for Local and Metropolitan Area Networks—Timing and Synchronization for Time-Sensitive Applications in Bridged Local Area Networks. For example, PTP nodes may exchange Ethernet messages over the network 140 that synchronize the PTP nodes to a common time reference by providing clock master selection and negotiation mechanisms, link delay measurement and compensation, and clock rate matching and adjustment mechanisms. PTP provides a Best Master Clock Algorithm (BMCA), which is an algorithm for negotiating which of the clocks in the PTP nodes is to be the master clock. In particular, BMCA describes a negotiation and a signaling mechanism that identifies a grandmaster node. Once the grandmaster node is selected, synchronization may begin automatically between the grandmaster node and the other PTP nodes, which are known as slave nodes. PTP messages transmitted from the grandmaster node, the slave nodes, or both, may include a timestamp value taken from the RTC 150, such as the RTC 1 in Transmitter 1 or the RTC 150 in some other device. Each of the slave nodes may compare a value of the RTC 150 in the respective slave node, such as RTC 2 in Transmitter 2 and RTC 3 in the receiver 130, with a value of the RTC 150 in the grandmaster node, such as RTC 1 in Transmitter 1. By using link delay measurement and compensation techniques, the slave nodes may synchronize the RTC 150 in each of the slave nodes with the RTC 150 at the grandmaster node. Once the RTCs are synchronized with each other, periodic messages may provide information that enables the PTP rate matching adjustment algorithms. As a result, the RTC 150 in each of the PTP nodes may remain synchronized to a common time.

The grandmaster node and the slave nodes of the grandmaster node are said to be in a common clock domain. Accordingly, the number of clock domains in the system 100 may correspond to the number of grandmaster nodes in the system 100 selected by the clock synchronization protocol. A clock domain identifier may identify a clock domain. The clock domain identifier may include, for example, an identifier of the grandmaster node.

During operation of the system 100, each of the transmitters 110 may transmit one or more of the media streams 165 to the receiver 130. For example, Transmitter 1 may transmit Media Stream 1 in time-stamped packets 142 to the receiver 130. Transmitter 2 may transmit Media Stream 2 in time-stamped packets 144 to the receiver 130.

The time-stamped packets 142 and 144 may include media stream samples including audio, video, or a combination of both. The media stream samples may include samples of one or more of the media streams 165. The media stream samples may be sampled at a rate determined by the media clock 120 located at each of the transmitters 110.

In addition, the time-stamped packets 142 and 144 may include timestamps. The timestamps may be presentation times based on values of the real-time clocks 150 at the transmitters 110. For example, each of the timestamps may include a value of the RTC 150 sampled at a corresponding one of the transmitters 110. A presentation time, for example, may be the value of the RTC 150 plus an estimated propagation delay.

The receiver 130 may generate the media streams 165 from the time-stamped packets 142 and 144 received from the transmitters 110 based on the RTC (RTC 3) 150 and the media clock 120 (designated Media Clock 3) at the receiver 130. For example, the receiver 130 may generate Media Stream 1 and Media Stream 2. The media clock recovery module 160 in the receiver 130 may generate Media Clock 3 from the time-stamped packets 142 and 144. Examples of mechanisms for transmitting media streams encapsulated in time-stamped packets 142 and 144 to receivers and extracting media streams and media clocks at receivers is described in U.S. application Ser. No. 13/024,016, "MEDIA EXTRACTOR" filed Feb. 9, 2011.

The media clock recovery module 160 in the receiver 130 may generate Media Clock 3 either from the time-stamped packets 142 of Media Stream 1 or from the time-stamped packets 144 of Media Stream 2. Media Clock 3 generated at the receiver 130 may be outputted along with any of the media streams 165 generated by the receiver 130 that are in a common clock domain, such as Media Stream 1 and Media Stream 2. The media clock recovery module 160 in the receiver 130 may generate the media clock 120 such that Media Clock 3 is synchronized with Media Clock 1 or Media Clock 2—or, if Media Clock 1 and Media Clock 2 are synchronized, such that Media Clock 3 is synchronized with both Media Clock 1 and Media Clock 2.

As described above, the reference media clock generator 155 may generate the media clock 120 in Transmitter 1. As also described above, Transmitter 1 may generate the time-stamped packets 142 of Media Stream 1 based on RTC 1 sampled according to the Media Clock 1. Transmitter 1 may also generate time-stamped packets 146 of a media clock stream. The media clock stream may be any data stream that includes timestamps based on values of the real-time clock 150, such as RTC 1, sampled according to the media clock 120, Media Clock 1. For example, the time-stamped packets 146 of the media clock stream may include the timestamps 142 that are in the time-stamped packets of Media Stream 1 but not include the media stream samples of Media Stream 1. Alternatively or in addition, the time-stamped packets 146 of the media clock stream may include both the timestamps and the media stream samples of one or more of the media streams 165. Alternatively or in addition, the time-stamped packets 146 of the media clock stream may include timestamps based on the RTC 150 that are generated independently of the timestamps in any of the time-stamped packets 142 and 144 of the media streams 165.

Transmitter 2 may receive the time-stamped packets 146 of the media clock stream from Transmitter 1. The media clock recovery module 160 of Transmitter 2 may generate the media clock 120 in Transmitter 2 based on RTC 2 and the time-stamped packets 146 of the media clock stream from Transmitter 1. Thus, the media clock recovery module 160 in Transmitter 2 may generate the media clock 120 using one or more of the same mechanisms that the media clock recovery module 160 in the receiver 130 uses to generate the media clock 120. Accordingly, Media Clock 1 and Media Clock 2 in the transmitters 110 may be synchronized with each other.

Transmitter 2 may receive the time-stamped packets 146 of the media clock stream from Transmitter 1 in any number of ways. For example, Transmitter 2 may be configured to subscribe to the media clock stream using a stream identifier that identifies the media clock stream. Alternatively or in addition, Transmitter 1 may be configured to transmit the media clock stream to a set of one or more devices, such as Transmitter 2. Alternatively or in addition, Transmitter 1 may advertise the availability of the media clock stream with the MCN Advertise packets and, in response, Transmitter 2 may elect to receive the media clock stream in accordance with the MCN Protocol described in more detail below.

The application module 148, such as Application Module 1, may assign the media clock stream a priority, the clock domain identifier, or any combination thereof in order to provide control over which advertised media clock stream is elected. Assigning the priority to the media clock stream may also facilitate dedicating different media clock streams to different uses.

For example, priorities may be assigned based on the type of device generating the media clock stream. In one example, a product may be marketed and sold as a device dedicated to generating a very accurate media clock. The device may advertise any media clock stream generated by the device as having a high priority so that the media clock stream will likely be selected as the reference media clock stream.

In a second example, priorities may be assigned based on the criticality of the device generating the media clock stream. For example, in a live performance (for example, a concert, a play, or other performance), a mixing desk may be a critical component because the mixing desk may be required to operate for the duration of the performance. Accordingly, the mixing desk may advertise any media stream generated by the mixing desk as having a high priority so that the media clock stream will likely be selected as the reference media clock stream. If the mixing desk fails, then reassigning media clocks is not the biggest issue. In contrast, if the media clock stream generated by an obscure piece of equipment is selected and the obscure piece of equipment fails, then the media clocks may need to be reassigned during the performance.

In a third example, priorities may be assigned based on the stability of the device generating the media clock stream. The most stable device in the system 100 may be assigned the highest priority media clock stream. Assigning the priorities based on the stability of the device may be applicable to live performance and to home networks. For example, in a home network, mobile devices, such as smart phones and mobile media devices, may supply audio/video to an audio/video system that is affixed to the home or is otherwise immobile. Since the installed system may be more physically stable, the installed system may be less likely to leave a room in a home than the mobile devices. Accordingly, the installed audio/video system may advertise any media clock stream generated by the installed system as having a high priority so that any media clock stream generated by the installed audio/video system is more likely to be selected as the reference media clock stream than the media clock streams generated by the mobile devices.

Each advertised media clock stream may include a frequency or a base clock rate of the media clock 120 associated with the media clock stream. Each of the transmitters 110 may, for example, select a reference media clock stream from among the advertised media clock streams based on the base clock rate being compatible with the clock rate to be used with the media stream transmitted by the transmitter.

Each advertised media clock stream may include a clock domain identifier, such as a gPTP Grandmaster identifier (gm_id) or other grandmaster identifier that identifies a grandmaster clock on the network 140 in order to help determine if the streams are in the same clock domain, such as a gPTP domain defined in IEEE 802.1AS-2011. The clock domain identifier may identify a clock domain or media clock domain. The media clock domain may represent a logical group of devices that may share a common media clock. Advertised media clock streams may be in the same clock domain as Transmitter 2 if RTC 2 in Transmitter 2 shares the same grandmaster clock with which the RTC 150 used to generate the advertised media clock streams. Alternatively or in addition, the clock domain identifier may include an identifier—other than the grandmaster identifier—such as a media clock negotiation (MCN) domain. The MCN domain may identify the media clock domain. In one example, the grandmaster identifier may identify the gPTP domain or clock domain, whereas the MCN domain may identify the media clock domain. For example, a single gPTP domain may include multiple MCN domains, and each of the MCN domains are entirely contained in the single gPTP domain. Consider a recording studio with multiple recording rooms as an example. The entire recording studio may be in a single gPTP domain, but each one of the recording rooms may be assigned a different MCN domain than the other recording rooms. By virtue of the assignment of MCN domains as the media clock domains, the media clocks in each recording room may be controlled independently of the media clocks in the other recording rooms. For example, the transmitter 110 receiving the MCN Advertise packets may determine that any advertised media clock stream that is not in the same media clock domain as the transmitter 110 does not qualify as the reference media clock stream for the transmitter 110. Accordingly, the media clock domain may be identified by the clock domain identifier, which may include the grandmaster identifier, the MCN domain, or any combination thereof.

The system 100 illustrated in FIG. 1 may include additional, fewer, or different components. For example, the system 100 may include a device dedicated to generating the time-stamped packets 146 of the media clock stream. Accordingly, the dedicated device may include the reference media clock generator 155. The dedicated device may not generate time-stamped packets 142 and 144 of any of the media streams 165. Alternatively or in addition, the system 100 may include additional transmitters 110 and receivers 130.

The transmitters 110 and the receiver 130 may include additional, fewer, or different components. For example, each of the transmitters 110, such as Transmitter 1 and Transmitter 2, may include the media clock recovery module 160 but not the reference media clock generator 155. Alternatively, each of the transmitters 110 may include both the media clock recovery module 160 and the reference media clock generator 155. Alternatively or in addition, each of the transmitters 110 may include multiple media clock recovery modules, multiple reference media clock generators, or a combination thereof. In some examples, a device that communicates with the transmitters 110 may include the application module 148, the reference media clock module 155, and the media clock recovery module 160 instead of the transmitters 110.

In the example illustrated in FIG. 1, each of the transmitters 110 transmits one of the media streams 165. However, in some examples, any of the transmitters 110 may transmit two or more of the media streams 165.

A device that includes the media clock recovery module 160, such as Transmitter 2, may generate and advertise the media clock stream that corresponds to the recovered media clock, Media Clock 2. Accordingly, the device may transmit the media clock stream based on the media clock, such as Media Clock 2, that is generated by the media clock recovery module 160.

Figure 2:
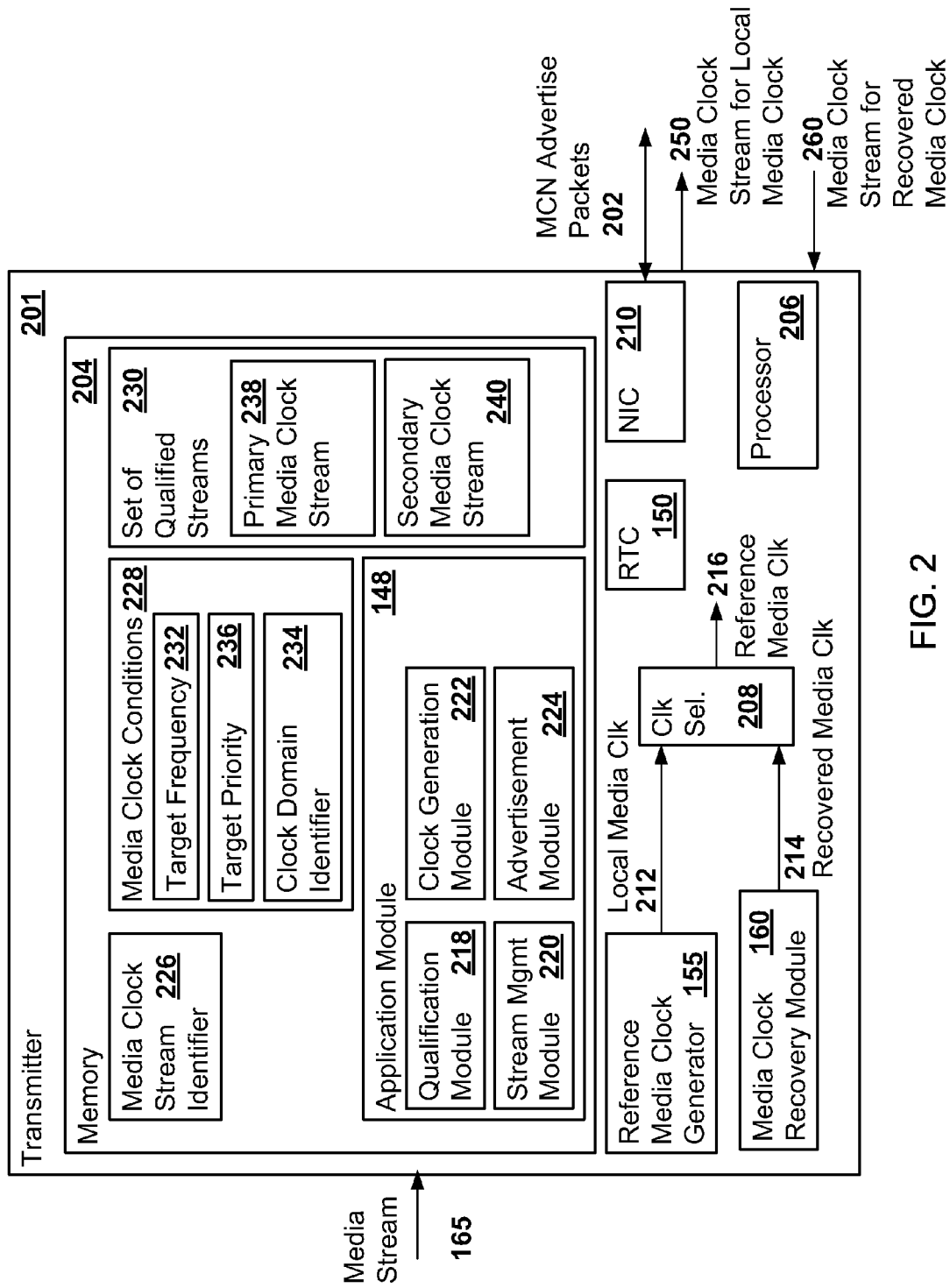
FIG. 2 is a diagram of an example of a transmitter that generates and receives Media Clock Negotiation Advertise packets.

FIG. 2 is a diagram of an example of a transmitter 201 that generates and receives MCN Advertise packets 202. The transmitter 201 may include a memory 204, a processor 206, the reference media clock generator 155, the media clock recovery module 160, a clock selector 208, the RTC 150, and a network interface controller (NIC) 210.

The clock selector 208 may include a component that selects from two or more inputs and outputs the selected input. For example, the clock selector 208 may receive a local media clock 212 generated by the reference media clock generator 155 as a first input, and a recovered media clock 214 from the media clock recovery module 160 as a second input. Thus, the clock selector 208 may be directed to output either the first input or the second input as a reference media clock 216. Examples of the clock selector 208 include a multiplexer and any other a multiple-input, single-output switch.

The network interface controller (NIC) 210 may include hardware or a combination of hardware and software that enables communication over the network 140. The NIC 210 may provide physical access to the network 140 and provide a low-level addressing system through use of, for example, Media Access Control (MAC) addresses. The NIC 210 may include a network card that is installed inside a computer or other device. Alternatively or in addition, the NIC 210 may include an embedded component as part of a circuit board, a computer mother board, a router, an expansion card, a printer interface, a USB (universal serial bus) device, or as part of any other hardware. In one example, the transmitter 201 may be included in the network interface controller 210 instead of the transmitter 201 comprising the network interface controller 210.

The memory 204 may be any data storage device or combination of data storage devices. The memory 204 may include non-volatile and/or volatile memory, such as a random access memory (RAM), a read-only memory (ROM), an erasable programmable read-only memory (EPROM), or flash memory. Alternatively or in addition, the memory 204 may include an optical, magnetic (hard-drive) or any other form of data storage device.

The processor 206 may be in communication with the memory 204, the network interface controller 210, the RTC 150, the media clock recovery module 160, and the clock selector 208. The processor may also be in communication with additional components, such as a display. The processor 206 may include a general processor, a central processing unit of a computing device, a server device, an application specific integrated circuit (ASIC), a digital signal processor, a field programmable gate array (FPGA), a CPLD (complex programmable logic device), a digital circuit, an analog circuit, a microcontroller, or a combination thereof. The processor 206 may include one or more elements operable to execute computer executable instructions or computer code embodied in the memory 204 or in other memory to perform features of the system 100.

The computer code may be written in any computer language, such as C++, C#, Java, Pascal, Visual Basic, Perl, HyperText Markup Language (HTML), JavaScript, assembly language, any other computer language, or any combination thereof. For example, the computer code may include the application module 148. The computer code may include various modules, such as a qualification module 218, a stream management module 220, a clock generation module 222, and an advertisement module 224.

In addition to computer code, the memory 204 may include data constructs, such as a media clock stream identifier 226, a set of media clock conditions 228, and information about a set of qualified streams 230. Alternatively or in addition, the memory 204 may include additional, fewer, or different data constructs.

The media clock stream identifier 226 may identify the media clock stream that the transmitter 201 advertises. In one example, the media clock stream identifier 226 may include a stream identifier described in the IEEE 802.1Qat standard that identifies a media stream. In a second example, the media clock stream identifier 226 may include a stream identifier described in the IEEE 802.1Qat standard that identifies a type of stream that is different than, or a subset of, the media stream. In a third example, the media clock stream identifier 226 may include a stream identifier described by a standard other than the IEEE 802.1Qat standard.

The set of media clock conditions 228 may include conditions that the media clock streams are to meet in order to qualify as a potential media clock stream suitable for use by the application module 148. In one example, the set of media clock conditions 228 may include a target frequency 232 and a clock domain identifier 234. The set of media clock conditions 228 may include additional, fewer, or different conditions. For example, the set of media clock conditions 228 may include a target priority 236.

The set of qualified streams 230 may include information about the media clock streams that were determined to be qualified streams based on the media clock conditions 228. The information about the set of qualified streams 230 may include information about a fixed number of the media clock streams. For example, the information about the set of qualified streams 230 may identify a primary media clock stream 238 and a secondary media clock stream 240. Accordingly, the information about the set of qualified streams 230 may include a stream identifier, a priority, a source address, and/or other properties of each one of the qualified streams. For example, the information about the set of qualified streams 230 may include a mcn_primary_stream_id, a mcn_prima-ry_priority, and a mcn_primary_source_address for the primary media clock stream 238, and a mcn_secondary_stream_id, a mcn_secondary_priority, and a mcn_secondary_source_address for the secondary media clock stream 240.

As described in detail later below, the transmitter 201 may receive the MCN Advertise packets 202 during operation of the system 100. One or more of the MCN Advertise packets 202 received may advertise one or more media clock streams, such as a media clock stream 260 from which the media clock recovery module 160 generates the recovered media clock 214. Alternatively or in addition, the transmitter 201 may transmit one or more of the MCN Advertise packets 202 during operation of the system 100. As described in detail below, the transmitter 201 may transmit one or more of the MCN Advertise packets 202 to advertise a media clock stream 250 that corresponds to the local media clock 212.

In addition, the transmitter 201 may transmit the media clock stream 250 corresponding to the local media clock 212 if the media clock stream 250 is elected by another one of the transmitters 110. Alternatively or in addition, the transmitter 201 may receive the media clock stream 260 from which the media clock recovery module 160 may generate the recovered media clock 214.

1. MCN Protocol Message Formats

The MCN Advertise packets 202 may be formatted in any number of ways. In one example, the MCN protocol may use a single packet format for messages other than the format of the time-stamped packets 146 of the media clock streams 250 and 260. In a second example, the MCN protocol may use multiple types of messages, each of the types of messages having a different respective format than the other. The format of the time-stamped packets 142 and 144 of the media streams 165 may be described by standards other than the MCN protocol in some examples.

Figure 3:
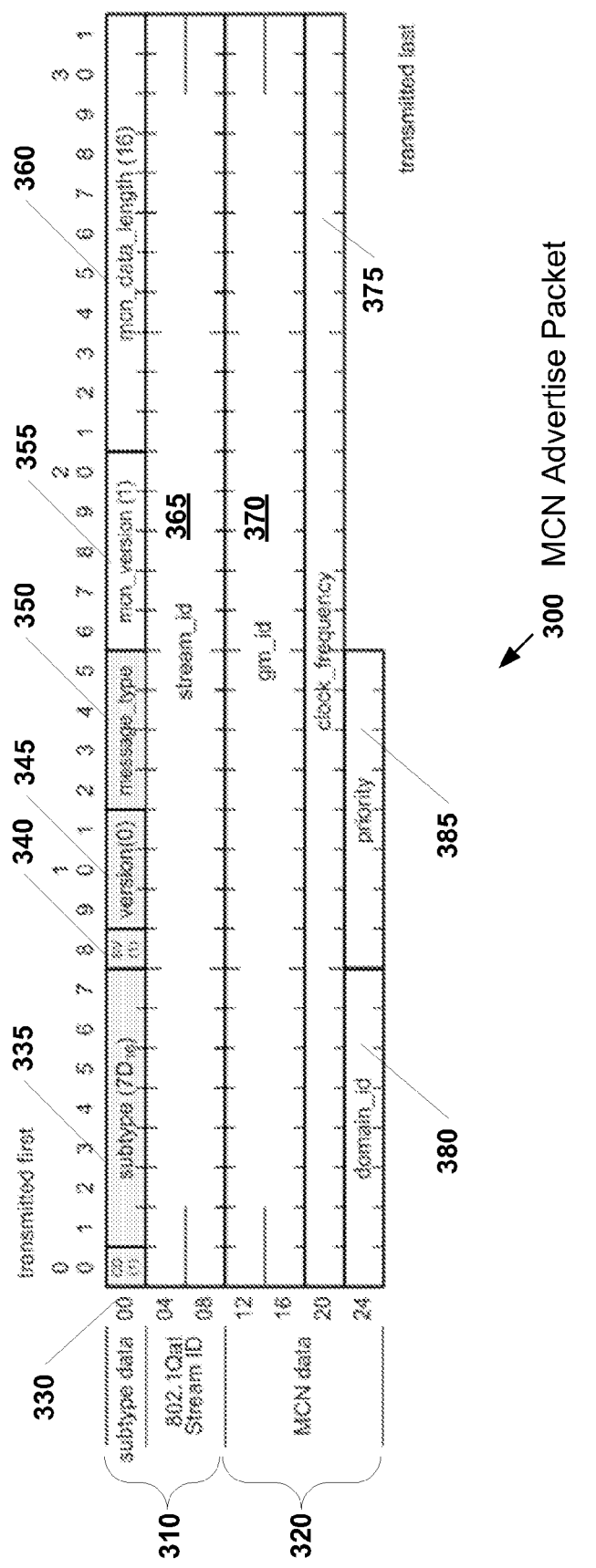
FIG. 3 illustrates an example packet format of a Media Clock Negotiation Advertise packet.

FIG. 3 illustrates an example packet format of a MCN Advertise packet 300. The MCN Advertise packet 300 may be, for example, the single packet format used in the MCN protocol. In the example illustrated in FIG. 3, the MCN Advertise packet 300 includes an AVBTP common control packet header 310 followed by a payload that includes MCN data 320.

The AVBTP common control packet header 310 may include standard fields of the AVBTP common control packet header plus additional fields. For example, the AVBTP common control packet header 310 may include a CD field 330, a subtype field 335, a SV (Stream ID Valid) field 340, a version field 345, a message_type field 350, a mcn_version field 355, a mcn_data_length field 360, and a stream_id field 365.

The MCN data 320 may include fields that provide information about the media clock stream 250 or 260 advertised in the MCN Advertise packet 300. The MCN data 320 may include, for example, a gm_id field 370, a clock frequency field 375, a domain_id field 380, and a priority field 385.

The CD field 330 may indicate whether the MCN Advertise packet 300 includes Control or Data information. In one example, the CD field 330 may be the CD field described in IEEE 1722-2011. The CD field 330 may be set to 1, for example, indicating that the MCN Advertise packet 300 includes Control information. The subtype field 335 may be, for example, the subtype field described in IEEE 1722-2011. The subtype field 335 may identify the MCN Advertise packet 300 as an MCN packet as opposed to some other type of packet that is defined by IEEE 1722. The subtype field 335 may be set to 0x7d hexadecimal or some other suitable value. The SV (StreamID valid) field 340 may indicate whether the advertised stream is valid or available. For example, the SV field 340 may be set to a value one (1) indicating that the advertised media clock stream is valid. The version field 345 may identify the version of the AVBTP standard with which the MCN packet conforms. The message_type field 350 may indicate the type of the packet 300. For example, the message_type field 350 may include a particular MCN message type as listed in Table 1 below. For example, the message_type field 350 may include MCN_ADVERTISE, which is a value that indicates the MCN message type is a packet that advertises the media clock stream 250 or 260. Values other than MCN_ADVERTISE may indicate that the packet is a different type of packet than the MCN Advertise packet 300. Values may be reserved for future use by the MCN protocol. If the transmitter 201 receives the MCN Advertise packet 300 that has the message_type field 350 set to a reserved value, then the transmitter 201 may ignore the MCN Advertise packet 300.

TABLE 1

MCN Protocol Message Types

| Value (decimal) | Use | Meaning |
|---|---|---|
| 0 | — | Reserved |
| 1 | MCN_ADVERTISE | Advertise a Media Clock Stream |
| 2-15 | — | Reserved |

The mcn_version field 355 may identify the version of the MCN protocol with which the MCN Advertise packet 300 conforms. For example, the version of the MCN protocol may be one (1) or some other value. If the MCN packet 300 is received with an unknown value in the mcn_version field 355, then the packet may be ignored.

The stream_id field 365 may include the stream identifier of the media clock stream 250 or 260 that is advertised in the MCN Advertise packet 300. For example, the stream identifier may include an identifier with which a recipient of the MCN Advertise packet 300 may subscribe to the media clock stream 250 or 260.

The mcn_data_length field 360 may include the length of the MCN data 320. For example, the mcn_data_length field 360 may be set to 16 bytes.

In the MCN data 320, the gm_id field 370 may include the identifier of the grandmaster node or clock associated with the media clock stream 250 or 260 that is advertised in the MCN Advertise packet 300. For example, the gm_id field 370 may include the gPTP grandmaster identifier of the RTC 150 on which the advertised media clock stream 250 or 260 is based.

The clock frequency field 375 may include a value that indicates the frequency of the media clock 165 associated with the media clock stream 250 or 260 advertised in the MCN Advertise packet 300. For example, the clock_frequency field 375 may identify the frequency in hertz of the media clock 165. Alternatively or in addition, the clock_frequency field 375 may include a period of the media clock 165 on which the advertised media clock stream 250 or 260 is based. The period may be the multiplicative inverse of the frequency.

The domain_id field 380 may include the clock domain identifier of the advertised media clock stream 250 or 260. If only a single clock domain is in use, then the domain_id field 380 may be set to zero (0) or some other predetermined value.

The priority field 385 may include the priority of the advertised media clock stream 250 or 260. The default value for the priority field may be 248 or some other value. A lower value may indicate a higher priority media clock stream. Alternatively, a lower value may indicate a lower priority media clock stream.

The MCN Advertise packet 300 may be advertised in any number of ways. For example, the MCN Advertise packet 300 may be broadcast with a multicast destination MAC address set to a predetermined MCN protocol multicast address. Alternatively, the MCN Advertise packet 300 may be unicast to one or more destination network addresses.

A source MAC address (not shown) of the MCN Advertise packet 300 may be set to a MAC address of a sender of the MCN Advertise packet 300. Alternatively or in addition, the sender and/or destination of the MCN Advertise packet 300 may be indicated with any other type of network address, such as an IP (Internet Protocol) address. An Ethertype field (not shown) of the MCN Advertise packet 300 may be set to the AVBTP Ethertype.

The MCN protocol may involve (1) listening for MCN Advertise packets 202 and (2) advertising the MCN Advertise packets 202. Listening for the MCN Advertise packets 202 may include receiving the MCN Advertise packets 202 and maintaining information about the set of qualified streams 230. Advertising the MCN Advertise packets 202 may include advertising a locally sourced media clock stream, such as the media clock stream 250 for the local media clock 212 if the media clock stream 250 qualifies as one of the streams in the set of qualified streams 230.

2. MCN Election

Referring to FIG. 2, the application module 148 may use the MCN protocol to determine the set of qualified streams 230 from the MCN Advertise packets 202 during MCN election. The application module 148 may further select a qualified media clock stream from the set of qualified streams 230 and generate the reference media clock 216 from the selected qualified media clock stream.

For example, the qualification module 218 of the application module 148 may determine the set of qualified streams 230 from the MCN Advertise packets 202. The qualification module 218 may receive one or more of the MCN Advertise packets 202 via the NIC 210. For each media clock stream 260 advertised in the MCN Advertise packets 202, the qualification module 218 may determine whether the advertised media clock stream 260 satisfies the media clock conditions 228. The media clock conditions 228 may initially be set to corresponding values of the local media clock 212 or to corresponding values of the media clock stream 250 for the local media clock 212. Alternatively or in addition, the media clock conditions 228 may be set to predetermined values or user-specified values. For example, if the media stream 165 transmitted by the transmitter 201 is a video stream, then the target frequency 232 may be set to a frequency suitable for video, such as 15.734 kHz. In another example, the clock domain identifier 234 may be set to the clock domain identifier of the RTC 150 in the transmitter 201.

The qualification module 218 may compare properties of the advertised media clock stream, such as the grandmaster identifier, the clock domain identifier, and the frequency identified in the fields 370, 375, 380, and 385 of the MCN Advertise packet 300, to corresponding values in the media clock conditions 228, such as the target frequency 232 and the clock domain identifier 234. If the properties such as the grandmaster identifier, the clock domain identifier, or the frequency identified in the MCN Advertise packet 300 differ from the corresponding values in the media clock conditions 228, then the qualification module 218 may determine that the advertised media clock stream is not a qualified stream. Alternatively, if the properties of the advertised media clock stream match the media clock conditions 228, then the qualification module 218 may determine that the advertised media clock stream is a qualified stream. If the advertised media clock stream is not a qualified stream, then the qualification module 218 may discard the MCN Advertise packet 300.

If the advertised media clock stream 260 meets the media clock conditions 228, then the stream management module 220 may add the advertised media clock stream 260 to the set of qualified streams 230. In some examples, the stream management module 220 may not necessarily add the advertised media clock stream 260 to the set of qualified streams 230 if the advertised media clock stream 260 is a qualified stream. Instead, the stream management module 220 may add the advertised media clock stream 260 to the set of qualified streams 230 if the priority of the advertised media clock stream 260 exceeds the priority of the streams already in set of qualified streams 230. For example, the set of qualified streams 230 may be a fixed size that includes information about two streams: the primary media clock stream 238 and the secondary media clock stream 240. Accordingly, the stream management module 220 may maintain the set of qualified streams 230 such that the primary media clock stream 238 and the secondary media clock stream 240 are the two highest priority qualified streams that are available.

In one example, the lower the value that represents a priority, the higher the priority. The value that represents a priority may include, for example, a value in the priority field 385 of the MCN Advertise packet 300. Accordingly, if the value representing the priority of the advertised media clock stream is less than a value of the priority of the primary media clock stream 238 currently identified in the set of qualified streams 230, then the stream management module 220 may determine that the advertised media clock stream is a higher priority than the priority of the primary media clock stream 238. In response to a determination that the advertised media clock stream is a higher priority than the primary media clock stream 238 currently identified in the set of qualified streams 230, then the stream management module 220 may set the secondary media clock stream 240 to the primary media clock stream 238, and set the primary media clock stream 238 to the advertised media clock stream.

For example, if (1) the value in the priority field 385 of the MCN Advertise packet 300 is less than mcn_primary_priority of the primary media clock stream 238, or (2) the value in the priority field 385 is equal to mcn_primary_priority and a MAC source address of the MCN Advertise packet 300 is less than the mcn_primary_source_address (or some other tie-breaking mechanism), then the stream management module 220 may: (1) set mcn_secondary_stream_id to mcn_primary_stream_id; (2) set mcn_secondary_priority to mcn_primary_priority; (3) set mcn_seconday_source_address to mcn_primary_source_address; (4) set mcn_primary_stream_id to the value in the stream_id field 365 of the MCN Advertise packet 300; (5) set mcn_primary_priority to the value in the priority field 385 of the MCN Advertise packet 300; and (6) set mcn_primary_source_address to the MAC source address of the MCN Advertise packet 300.

Alternatively, if the value in the priority field 385 of the MCN Advertise packet 300 is greater than mcn_primary_priority of the primary media clock stream 238, then the stream management module 220 may check whether the advertised media clock stream has a higher priority than other qualified streams, such as the secondary media clock stream 240. For example, if the value in the priority field 385 of the MCN Advertise packet 300 is less than mcn_secondary_priority or the value in the priority field 385 is equal to mcn_secondary_priority and the MAC source address of the MCN Advertise packet 300 is less than mcn_secondary_source_address (or some other tie-breaking mechanism), then the stream management module 220 may: (1) set mcn_secondary_stream_id to the value in the stream_id field 365 of the MCN Advertise packet 300; (2) set mcn_secondary_priority to the value in the priority field 385 of the MCN Advertise packet 300; (3) set mcn_secondary_source_address to the MAC source address of the MCN Advertise packet 300.

Accordingly, the qualification module 218 and the stream management module 220 may determine the set of qualified streams 230. For example, the qualification module 218 and the stream management module 220 may determine the primary media clock stream 238 and, if a second qualified stream is available, the secondary media clock stream 240.

The clock generation module 222 may select a reference media clock stream from the set of qualified streams 230, where the reference media clock stream has the highest priority of the streams in the set of qualified streams 230. Alternatively, the clock generation module 222 may select the reference media clock stream from the set of qualified streams 230 based on a property of the qualified streams other than, or in addition to, the priority of the qualified streams. For example, the reference media clock stream selected may be the media clock stream 260 for the recovered media clock 214. The clock generation module 222 may subscribe to the stream identity of the media clock stream 260. In response, the transmitter 201 may receive the media clock stream 260. The media clock recovery module 160 may generate the recovered media clock 214 from the media clock stream 260. In one example, the clock generation module 222 may direct the clock selector 208 to select the recovered media clock 214 as the reference media clock 216. Accordingly, the transmitter 201 may generate the time-stamped packets 142 or 144 of the media stream 165 based on the reference media clock 216 and the RTC 150.

In one example, the clock generation module 222 may wait to select one of the qualified streams as the reference media clock stream until after the qualification module 218 and the stream management module 220 receive and process the MCN Advertise packets 202 for the duration of a clock identification period. The clock identification period may equal, for example, MCN_ADVERTISE_TIMEOUT*MCN_ADVERTISE_INTERVAL. The MCN_ADVERTISE_INTERVAL may be a time interval, such as one second, at which the MCN Advertise packet 300 is periodically transmitted. MCN_ADVERTISE_TIMEOUT may be the number of time intervals (MCN_ADVERTISE_INTERVAL) that may pass before the media clock stream 260 identified in the MCN Advertise packet 300 may be considered unavailable or not qualified. Alternatively, the clock identification period may be any configurable or predetermined length of time.

The stream management module 220 may monitor the qualified streams in the set of qualified streams 230 in order to determine whether any of the qualified streams times out. The stream management module 220 may monitor the qualified streams during the clock identification period, after the clock identification period, or both. If one of the qualified streams times out, then the stream management module 220 may remove the timed-out stream from the set of qualified streams 230. If the qualified stream that is selected as the reference media clock stream times out, then the clock generation module 222 may select a different media clock stream in the set of qualified streams 230 as the reference media clock stream. For example, the clock generation module 222 may select a lower priority stream as the reference media clock stream.

For example, if a timeout period, such as MCN_ADVERTISE_TIMEOUT*MCN_ADVERTISE_INTER- VAL, passes without the stream management module 220 receiving the MCN Advertise packet 300 for the current primary media clock stream 238, then the stream management module 220 may delete the information about the primary media clock stream 238 from the set of qualified streams 230 and identify the current secondary media clock stream 240 as the primary media clock stream 238 in the set of qualified streams 230. Similarly, if the timeout period passes without the stream management module 220 receiving the MCN Advertise packet 300 for the current secondary media clock stream 240, then the stream management module 220 may delete the information about the secondary media clock stream 240 from the set of qualified streams 230.

3. Advertising a Media Clock Stream

The advertisement module 224 may advertise the media clock stream 250 that corresponds to the local media clock 212. In one example, the advertisement module 224 may advertise the media clock stream 250 that corresponds to the local media clock 212 if the media clock stream is included in the set of qualified streams 230 after the clock identification period, but not advertise the media clock stream 250 otherwise. By waiting until after the clock identification period passes, the advertisement module 224 may avoid advertising the media clock stream 250 for the local media clock 212 when the media clock stream 250 would not be included in the set of qualified streams 230 in view of other available media clock streams in the system 100. The clock identification period may start, for example, on startup of the application module 148. The clock identification period may start at some other time, such as whenever the set of qualified streams 230 changes.

After the clock identification period has elapsed, the stream management module 220 may compare the priority of the media clock stream 250 for the local media clock 212 (also referred to as the local media clock stream 250) with priority of the qualified streams in the set of qualified streams 230 previously populated by processing the MCN Advertise packets 202. In some examples, the stream management module 220 may compare the MAC address of the transmitter 201 with the MAC source address associated the qualified stream in order to break a tie in the event that the priority of the local media clock stream 250 is the same as a priority of a qualified stream in the set of qualified streams 230. If local media clock stream 250 qualifies to be added to the set of qualified streams 230 and is high enough priority, then the stream management module 220 may add information about the local media clock stream 250 to the set of qualified streams 230. For example, the stream management module 220 may replace the information about the primary or secondary media clock streams 238 and 240 with the stream identifier 226 of the local media clock stream 250, the priority of the local media clock stream 250, and the MAC source address of the transmitter 201.

If the set of qualified streams 230 includes the local media clock stream 250, then the advertisement module 224 may advertise the local media clock stream 250. For example, the advertisement module 224 may format the MCN Advertise packet 300 by populating the fields with suitable values. The advertisement module 224 may start a timer that expires after MCN_ADVERTISE_INTERVAL. In response to expiration of the timer, the advertisement module 224 may transmit the MCN Advertise packet 300 and reset the timer to MCN_ADVERTISE_INTERVAL. Alternatively, if the media clock stream 250 for the local media clock 212 is not in the set of qualified streams 230, then the advertisement module 224 may not to advertise the media clock stream 250.

As described above, if one of the qualified streams times out, then the stream management module 220 may remove the timed-out stream from the set of qualified streams 230. If none of the qualifying streams in the set of qualified streams 230 is the media clock stream 250 for the local media clock 212, then the stream management module 220 may add the media clock stream 250 for the local media clock 212 to the set of qualified streams 230 in response to removing the timed-out media clock stream.

For example, if the media clock stream 250 for the local media clock 212 is not initially included in the set of qualified streams 230, and if the timeout period elapses without receiving the MCN Advertise packet 300 for either the primary or secondary media clock streams 238 and 240, then the information for the timed-out stream may be deleted from the information about the set of qualified streams 230. If the primary media clock stream 238 expires and is deleted, then the secondary media clock stream 240 may replace the primary media clock stream 238 and the local media clock stream 250 may become the secondary media clock stream 240. Alternatively, if the secondary media clock stream 240 expires and is deleted, then the local media clock stream 250 may replace the secondary media clock stream 240. If the local media clock stream 250 is selected for the reference media clock stream, then the clock generation module 222 may direct the clock selector 208 to select the local media clock 212 as the reference media clock 216.

The transmitter 201 may include additional, fewer, or different components. For example, the transmitter 201 may include the NIC 210, the RTC 150, while a physically discrete device separate from the transmitter 201 may include the memory 204, the processor 206, the reference media clock generator 155, the media clock recovery module 160, and the clock selector 208. The discrete device may provide the reference media clock 216 to the transmitter 201.

The components of the transmitter 201 may include additional, fewer, or different components. In one example, a single stream election module may replace, and perform the features of, both the qualification module 218 and the stream management module 220. In a second example, the memory 204 may include additional data structures, such as a history of qualified streams that were once in the set of qualified streams 230 but that had subsequently been removed from the set of qualified streams 230.

In the example described above, the stream management module 220 may compare the priority of the media clock stream 250 for the local media clock 212 with a priority of each qualified stream in the set of qualified streams 230 after the clock identification period has elapsed. Alternatively or in addition, the qualification module 218 may initially populate the set of qualified streams 230 with the media clock stream 250 corresponding to the local media clock 212 before processing the MCN Advertise packets 202. Each advertised media clock stream is compared with the media clock stream 250 for the local media clock 212 in the set of qualified streams 230 while processing the MCN Advertise packets 202 during the clock identification period. As a result, the stream management module 220 may skip comparing the priority of the media clock stream 250 for the local media clock 212 with the priority of each qualified stream in the set of qualified streams 230 after the clock identification period has elapsed.

In some examples, the set of qualified streams 230 may contain a variable number of qualified streams. The stream management module 220 may add any advertised media clock stream to the set of qualified streams 230 that the qualification module 218 indicated is qualified. The set of qualified streams 230 may be an ordered list that is ordered based on priority, some other attribute of the streams, such as the source MAC address, or a combination thereof. The clock generation module 222 may elect the first qualified stream in the ordered list, for example, and ignore the rest of the streams in the set of qualified streams 230. The advertisement module 224 may advertise the media clock stream 250 for the local media clock in response to a determination that the media clock stream 250 is one of a predetermined number of streams from the top of the ordered list of qualified streams.

The media clock streams 250 and 260 may be advertised using alternative types of advertisement mechanisms. For example, the transmitter 201 may broadcast a stream request message over the network 140 requesting notification of any available media clock streams. The stream request message may include a network address of the transmitter 201. Any device on the network 140 that is capable of generating the media clock stream 250 or 260 may respond by transmitting the MCN Advertise packet 300 to the network address of the transmitter 201. The transmitter 201 receives and processes one or more of the MCN Advertise packets 202 over the clock identification period and elects a suitably qualified stream from the set of qualified streams 230. The transmitter 201 may subscribe to the media clock stream 250 or 260 that is elected. In one example, the stream request message may include the media clock conditions 228, so that the devices that transmit the MCN Advertise packets 202 may transmit the MCN Advertise packets 202 in response to a determination that the advertised media clock streams 250 or 260 satisfy the media clock conditions 228.

The system 100, including the transmitter 201 in particular, may be implemented in many different ways. For example, although some features are shown stored in the computer-readable memory 204 (e.g., as logic implemented as computer-executable instructions or as data structures in memory), all or part of the system 100 may be stored on, distributed across, or read from the memory 204 or some other machine-readable media. The computer-readable media may include RAM, an optical storage device, a magnetic storage device, a hard disk, a floppy disk, a CD-ROM, a solid state memory device, or any other form of tangible storage device. Alternatively or in addition, all or part of the transmitter 201 may be implemented in one or more circuits or FPGAs.

The processing capability of the system 100 and the transmitter 201 may be distributed among multiple entity or nodes, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may implement the features of the application module 148.

The term "module" may refer to one or more executable modules. As described herein, the modules may include software, hardware or some combination thereof executable by the processor 206. Software modules may include instructions stored in the memory 204, or other memory device, that are executable by the processor 206 or other processor. Hardware modules may include various devices, components, circuits, gates, circuit boards, and the like that are executable, directed, and/or controlled for performance by the processor 206.

Figure 4:
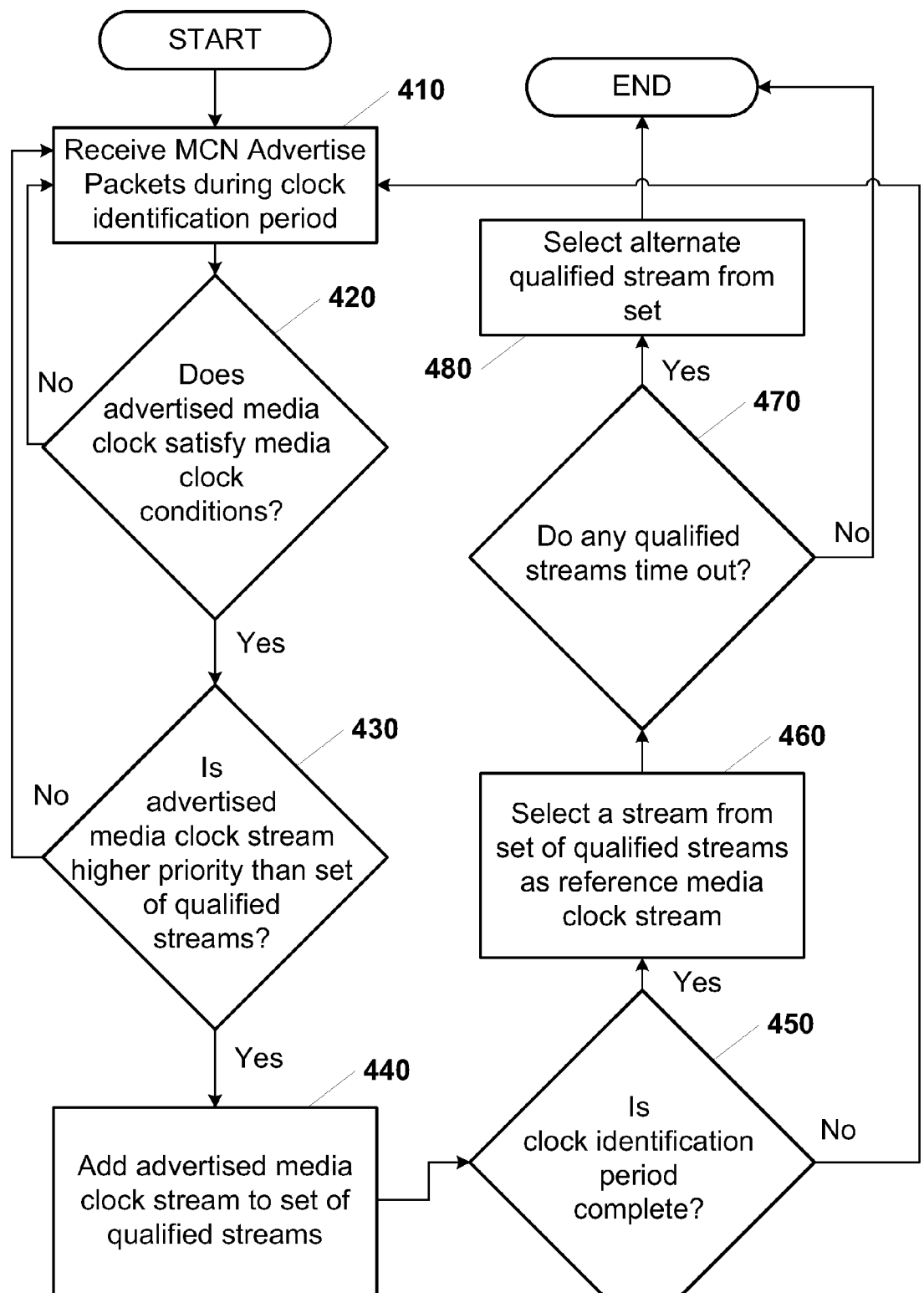
FIG. 4 illustrates an example flow diagram of the logic of electing a reference media clock stream from Media Clock Negotiation Advertise packets.

FIG. 4 illustrates an example flow diagram of the logic of electing the reference media clock stream from the Media Clock Negotiation Advertise packets 202. The operations may be executed in a different order than illustrated in FIG. 4, or may be described to include additional or fewer blocks illustrating similar functionality.

The logic may begin by the MCN Advertise packets 202 being received during the clock identification period (410). In response to receipt of one of the MCN Advertise packets 202, a determination of whether the advertised media clock stream identified in the MCN Advertise packet 300 satisfies the set of media clock conditions 228 may be made (420). If the advertised media clock stream 260 does not satisfy the set of media clock conditions 228, then the logic may return to the operation of the MCN Advertise packets 202 being received (410).

Alternatively, if the advertised media clock stream 260 satisfies the set of media clock conditions 228, then a determination of whether the advertised media clock stream 260 has a higher priority than any stream in the set of qualified streams 230 may be made (430). If the advertised media clock stream 260 does not have a higher priority than any stream in the set of qualified streams 230, then the logic may return to the operation of the MCN Advertise packets 202 being received (410).

Alternatively, if the advertised media clock stream 260 has a higher priority than any stream in the set of qualified streams 230, then the advertised media clock stream 260 may be added to the set of qualified streams 230 (440). In addition, a determination of whether the clock identification period has passed may be made (450). If the clock identification period has not passed, then the logic may return to the operation of the MCN Advertise packets 202 being received (410).

Alternatively, if the clock identification period has passed, then a qualified stream from the set of qualified streams 230 may be selected as the reference media clock stream (460). In addition, a determination of whether any stream in the set of qualified streams 230 times out may be made (470). If none of the streams in the set of qualified streams 230 times out, then the logic may end by, for example, returning to the operation in which the determination is made whether any stream in the set of qualified streams 230 times out (470).

Alternatively, if the primary media clock stream 238 in the set of qualified streams 230 times out, then an alternate qualified stream may be selected from the set of qualified streams 230 (480). After the alternate qualified stream is selected, then the logic may end by, for example, returning to the operation in which the MCN Advertise packets 202 are received (410).

The logic may include additional, different, or fewer operations than illustrated in FIG. 4. In one example, the logic may include an operation in which the stream selected from the set of qualified streams 230 is subscribed to, received, and the recovered media clock 214 is generated from the selected stream. In a second example, the logic may not include the operation in which the determination is made whether the advertised media clock stream 260 has a higher priority than any stream in the set of qualified streams 230 (430).

Figure 5:
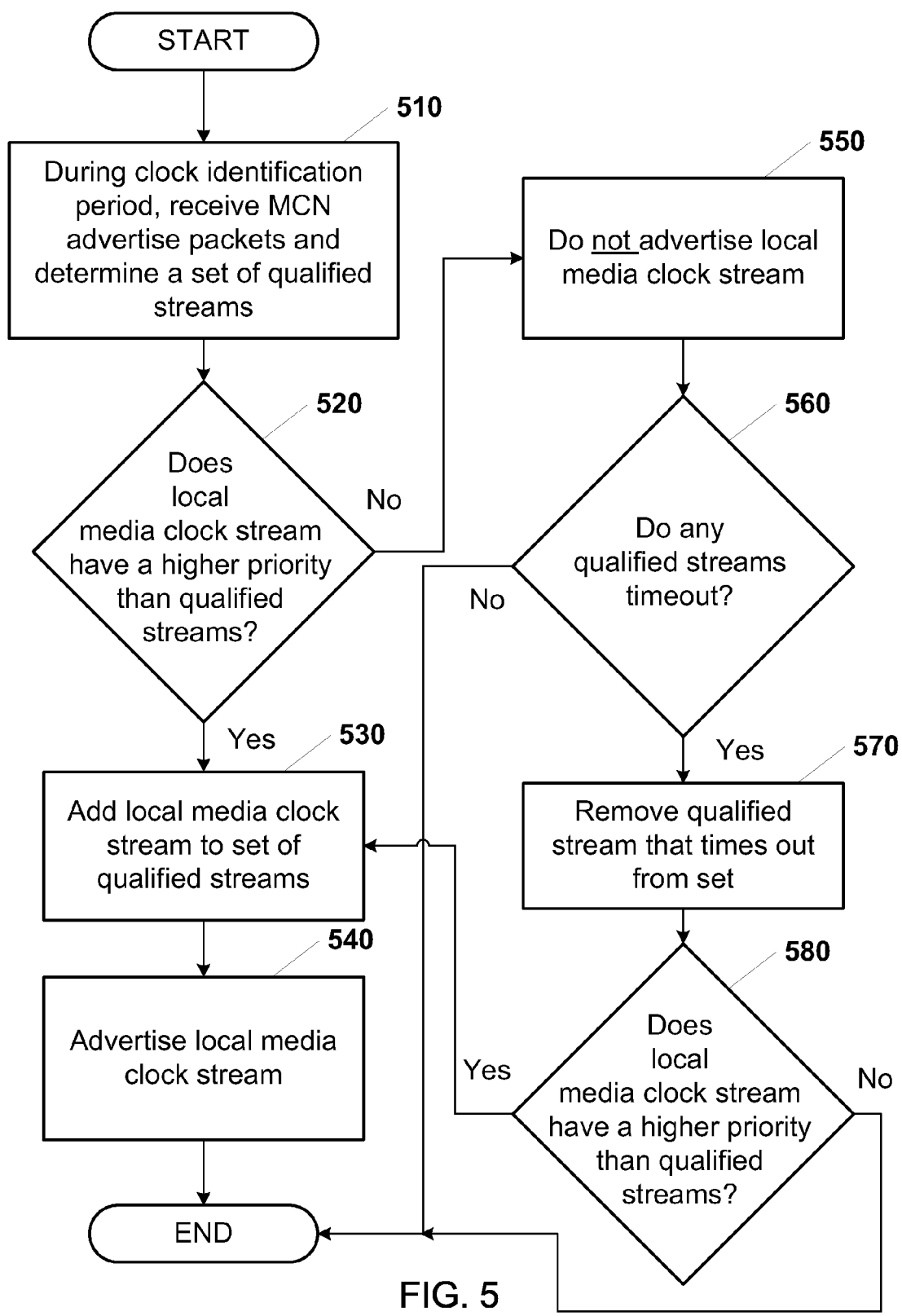
FIG. 5 illustrates an example flow diagram of the logic of determining whether to advertise a local media clock stream.

FIG. 5 illustrates an example flow diagram of the logic of determining whether to advertise the local media clock stream 250. The operations may be executed in a different order than illustrated in FIG. 5, or may be described to include additional or fewer blocks illustrating similar functionality.

The logic may begin by the set of qualified streams 230 being determined from the MCN Advertise packets 202 during the clock identification period (510). Next, a determination of whether the local media clock stream 250 has a higher priority than any stream in the set of qualified streams 230 may be made (520).

If the local media clock stream 250 has a higher priority than any stream in the set of qualified streams 230, then the local media clock stream 250 may be added to the set of qualified streams 230 (530). In addition, the local media clock stream 250 may be advertised (540). For example, the MCN Advertise packets 202 may be periodically transmitted over the network 140 identifying the local media clock stream 250 as available.

Alternatively, if the local media clock stream 250 has a lower priority than any stream in the set of qualified streams 230, then the local media clock stream 250 may not be advertised (550). Furthermore, the stream or streams in the set of qualified streams 230 may be monitored and a determination of whether any stream in the set of qualified streams 230 times out may be made (560).

In the absence of a timeout, then the logic may end by, for example, continuing to check for a timeout of any stream in the set of qualified streams 230. Alternatively, if any stream in the set of qualified streams 230 times out, then the qualified stream that times out may be removed from the set of qualified streams 230 (570). A determination of whether the local media clock stream 250 has a higher priority than any remaining qualified stream in the set of qualified streams 230 may be made (580).

If the local media clock stream 250 has a higher priority than any remaining qualified stream in the set of qualified streams 230, then the logic may continue to the operations in which the local media clock stream is added to the set of qualified streams (530) and the local media clock stream 250 is advertised (540).

Alternatively, if the local media clock stream 250 has a lower priority than any remaining qualified stream in the set of qualified streams 230, then the logic may end. For example, the logic may end by, for example, continuing to check for a timeout of any stream in the set of qualified streams 230.

The logic may include additional, different, or fewer operations than illustrated in FIG. 5. For example, the logic may include an operation in which a stream selected from the set of qualified streams 230 is subscribed to, received, and the recovered media clock 214 is generated from the selected stream.

Although specific components of innovations were described, methods, systems, and articles of manufacture consistent with the innovation may include additional or different components. For example, memories may be DRAM, SRAM, Flash or any other type of memory. Flags, data, tables, entities, and other data structures may be separately stored and managed, may be incorporated into a single memory or database, may be distributed, or may be logically and physically organized in many different ways. The components may be included on non-transitory computer readable media encoded with computer readable instructions. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed above may be provided on computer-readable media or memories or other tangible media, such as a cache, buffer, RAM, removable media, hard drive, other computer readable storage media, or any other tangible media or any combination thereof. The non-transitory computer readable media may include various types of volatile and nonvolatile storage media, such as RAM, flash drives, CD-ROMs, or other storage media. The functions, acts or tasks illustrated in the figures or described above may be executed in response to one or more sets of logic or instructions stored in or on computer readable media. The functions, acts or tasks are independent of the particular type of instructions set, storage media, processor or processing strategy, and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

The term "audio/video" may mean audio, video, or both. Thus, in one example, "audio/video" means only audio. In a second example, "audio/video" means only video. In a third example, "audio/video" means a combination of audio and video.

While various examples of the invention have been described, it will be apparent to those of ordinary skill in the art that many more examples and implementations are possible within the scope of the invention. Accordingly, the invention is not to be restricted except in light of the attached claims and their equivalents.

We claim:

1. A system for electing a reference media clock stream based on receipt of a plurality of Media Clock Negotiation Advertise packets, the system comprising:
   a network interface controller configured to receive the Media Clock Negotiation Advertise packets during a clock identification period;
   a qualification module configured to determine, for each advertised media clock stream advertised in the Media Clock Negotiation Advertise packets, whether the advertised media clock stream satisfies a set of media clock conditions;
   a stream management module configured to add the advertised media clock stream to a set of qualified streams in response to a determination that the advertised media clock stream satisfies the set of media clock conditions; and
   a clock generation module configured to select a qualified stream from the set of qualified streams as the reference media clock stream, where the reference media clock stream includes timestamps based on values of a real-time clock sampled according to a first media clock, a second media clock is generated from the reference media clock stream such that the second media clock is synchronized with the first media clock.

2. The system of claim 1 further comprising an advertisement module configured to advertise a local media clock stream in response to a determination that the local media clock stream has a higher priority than a stream included in the set of qualified streams after expiration of the clock identification period.

3. The system of claim 2, where the set of qualified streams includes a fixed number of streams, and the advertisement module is further configured to advertise the local media clock stream in response to a determination that the local media clock is included in the set of qualified streams after the expiration of the clock identification period.

4. The system of claim 1, where the set of media clock conditions comprises a target frequency, and where the qualification module is configured to determine that the advertised media clock stream satisfies the set of media clock conditions in response to a match of the target frequency with a frequency of a media clock corresponding to the advertised media clock stream.

5. The system of claim 1 further comprising a real-time clock, where the set of media clock conditions comprises a clock domain identifier of the real-time clock, where the qualification module is further configured to determine that the advertised media clock stream satisfies the set of media clock conditions in response to a match of the clock domain identifier of the advertised media clock stream with the clock domain identifier of the real-time clock.

6. The system of claim 1 further comprising a transmitter, the transmitter comprising a media clock recovery module and a real-time clock, where the clock generation module is further configured to direct the media clock recovery module to generate a recovered media clock from the reference media clock stream, and where the transmitter is configured to transmit a media stream encapsulated in time-stamped packets, the time-stamped packets comprising samples of the real-time clock sampled in accordance with the recovered media clock.

7. The system of claim 1, where the Media Clock Negotiation Advertise packets advertise a plurality of media clock streams, and at least one of the media clock streams has a different frequency than the other media clock streams.

8. A tangible non-transitory computer readable medium comprising computer executable instructions for advertising a local media clock stream corresponding to a local media clock, the computer executable instructions comprising:
   instructions executable by a processor to receive a plurality of Media Clock Negotiation Advertise packets during a clock identification period;
   instructions executable by the processor to determine, for each advertised media clock stream advertised in the Media Clock Negotiation Advertise packets, whether the advertised media clock stream meets a set of media clock conditions;
   instructions executable by the processor to add the advertised media clock stream to a set of qualified streams in response to a determination that the advertised media clock stream meets the set of media clock conditions;
   instructions executable by the processor to include the local media clock stream in the set of qualified streams based on a comparison of a priority of the local media clock stream and a priority of at least one media clock stream advertised in the Media Clock Negotiation Advertise packets; and
   instructions executable by the processor to advertise the local media clock stream as a reference media clock stream in response to a determination that the local media clock stream is included in the set of qualified streams, where the local media clock stream includes timestamps based on values of a real-time clock sampled according to the local media clock, a remote media clock being recoverable from the reference media clock stream such that the remote media clock is synchronized with the local media clock.

9. The computer readable medium of claim 8 further comprising instructions executable by the processor to advertise the local media clock stream only in response to a determination that the local media clock stream is not included in the set of qualified streams.

10. The computer readable medium of claim 8, where the media clock conditions include a target frequency.

11. The computer readable medium of claim 8, where the media clock conditions include a grandmaster node identifier that identifies a grandmaster clock of a real-time clock.

12. The computer readable medium of claim 8 further comprising instructions executable by the processor to advertise the local media clock stream through periodic transmission of at least one Media Clock Negotiation Advertise packet.

13. The computer readable medium of claim 8 further comprising instructions executable by the processor to delete a qualified stream from the set of qualified streams in response to a failure to receive a Media Clock Negotiation Advertise packet that advertises the qualified stream for a timeout period.

14. The computer readable medium of claim 8 further comprising instructions executable by the processor to detect a timeout of a first qualified stream in the set of qualified streams that is selected as the reference media clock stream, and instructions executable by the processor to select a second qualified stream from the set of qualified streams as the reference media clock stream in response to detection of the timeout of the first qualified stream.

15. A method for electing a reference media clock stream based on receipt of a plurality of Media Clock Negotiation Advertise packets, the method comprising:
   receiving the Media Clock Negotiation Advertise packets with a processor during a clock identification period;
   determining with the processor, for each advertised media clock stream advertised in the Media Clock Negotiation Advertise packets, whether the advertised media clock stream meets a set of media clock conditions;
   adding the advertised media clock stream to a set of qualified streams with the processor when the advertised media clock stream meets the set of media clock conditions; and
   selecting a qualified stream with the processor from the set of qualified streams as the reference media clock stream, where the reference media clock stream includes timestamps based on values of a real-time clock sampled according to a first media clock, a second media clock is generated from the reference media clock stream such that the second media clock is synchronized with the first media clock.

16. The method of claim 15, where determining the advertised media clock stream meets the set of media clock conditions comprises determining a priority of the advertised media clock stream is higher than a priority of any qualified stream in the set of qualified streams.

17. The method of claim 15 further comprising selecting an alternate qualified stream from the set of qualified streams as the reference media clock stream in response to the qualified stream timing out.

18. The method of claim 15 further comprising determining a local media clock stream has a higher priority than at least one qualified stream in the set of qualified streams after the clock identification period elapses.

19. The method of claim 18 further comprising advertising the local media clock stream in Media Clock Negotiation Advertise packets if the local media clock stream has the higher priority, and not advertising the local media clock stream if the local media clock stream has a lower priority.

20. The method of claim 18 further comprising adding the local media clock stream to the set of qualified streams in response to a determination that the local media clock stream has the higher priority.

21. A system for synchronizing media clocks at transmitters of media streams, the system comprising:
a first transmitter comprising:
   a reference media clock generator device configured to generate a first media clock; and
   an advertisement module configured to advertise a local media clock stream corresponding to the first media clock in at least one of a plurality of Media Clock Negotiation Advertise packets, where the first transmitter is configured to transmit a first media stream to a receiver based on the first media clock; and
a second transmitter comprising:
   a qualification module configured to receive the Media Clock Negotiation Advertise packets during a clock identification period and determine, for each advertised media clock stream advertised in the Media Clock Negotiation Advertise packets, that the advertised media clock stream satisfies a set of media clock conditions, where the advertised media clock stream includes the local media clock stream;
   a stream management module configured to add the advertised media clock stream to a set of qualified streams in response to a determination that the advertised media clock stream satisfies the set of media clock conditions;
   a clock generation module configured to select a qualified stream from the set of qualified streams as a reference media clock stream, where a second media clock is generated from the reference media clock stream such that the second media clock is synchronized with the first media clock, and where the second transmitter is configured to transmit a second media stream to the receiver based on the second media clock.

* * * * *